(12) United States Patent
Jacobsen

(10) Patent No.: US 6,876,094 B2
(45) Date of Patent: Apr. 5, 2005

(54) RESONANT ELECTRICAL GENERATION SYSTEM

(75) Inventor: Stephen C. Jacobsen, Salt Lake City, UT (US)

(73) Assignee: Sarcos, LC, Salt Lake City, UT (US)

( * ) Notice: Subject to any disclaimer, the term of this patent is extended or adjusted under 35 U.S.C. 154(b) by 163 days.

(21) Appl. No.: 10/086,640

(22) Filed: Feb. 28, 2002

(65) Prior Publication Data

US 2002/0175520 A1 Nov. 28, 2002

Related U.S. Application Data

(63) Continuation-in-part of application No. 09/439,473, filed on Nov. 12, 1999, now Pat. No. 6,375,454, and a continuation-in-part of application No. 09/627,852, filed on Jul. 28, 2000, now Pat. No. 6,425,740.

(51) Int. Cl.[7] .............................................. F23C 11/04
(52) U.S. Cl. ........................ 290/1 R; 310/13; 310/15; 310/36
(58) Field of Search ........................... 290/1 R; 310/13, 310/15, 25, 36

(56) References Cited

U.S. PATENT DOCUMENTS

| | | | |
|---|---|---|---|
| 1,983,405 A | | 12/1934 | Schmidt |
| 2,480,281 A | | 8/1949 | Begerow |
| 2,496,502 A | | 2/1950 | Steensma |
| 2,525,782 A | | 10/1950 | Dunbar |
| 2,539,535 A | * | 1/1951 | Espenschied ............... 290/1 R |
| 2,549,464 A | | 4/1951 | Hartley |
| 2,573,697 A | | 11/1951 | Dunbar et al. |
| 2,581,669 A | | 1/1952 | Kadenacy |
| 2,647,365 A | | 8/1953 | Myers |
| 2,838,102 A | | 6/1958 | Reimers |
| 3,093,962 A | | 6/1963 | Gluhareff |
| 3,393,964 A | | 7/1968 | Donnelly |
| 3,395,967 A | | 8/1968 | Karr |
| 3,473,879 A | | 10/1969 | Berberich |
| 3,545,211 A | | 12/1970 | Harp, Jr. |
| 3,656,878 A | | 4/1972 | Wright |
| 3,704,651 A | * | 12/1972 | Kupka .......................... 91/232 |
| 3,741,686 A | | 6/1973 | Smith |
| 3,766,399 A | * | 10/1973 | Demetrescu .............. 290/40 R |
| 3,954,380 A | | 5/1976 | Valaev et al. |
| 3,970,877 A | * | 7/1976 | Russell et al. ............... 310/339 |
| 4,370,101 A | | 1/1983 | Vander Horst |
| 4,412,786 A | | 11/1983 | Perry |
| 5,000,677 A | | 3/1991 | Lathion et al. |
| 5,123,835 A | | 6/1992 | Richards et al. |
| 5,302,112 A | | 4/1994 | Nabors, Jr. et al. |
| 5,319,948 A | * | 6/1994 | Blum et al. .................... 62/467 |
| 5,839,508 A | * | 11/1998 | Tubel et al. ................ 166/65.1 |
| 5,892,293 A | * | 4/1999 | Lucas .......................... 290/1 R |

\* cited by examiner

*Primary Examiner*—Joseph Waks
(74) *Attorney, Agent, or Firm*—Thorpe North & Western LLP

(57) ABSTRACT

A resonant electrical generation system includes a resonator, an energy source, and an electrical generator. The resonator provides resonating movement in a resonating element. The resonator can include a mass and spring element. The energy source is operatively coupled to the resonator to maintain resonating movement of the resonating element. The energy source can be a pulsatile linear combustor. The electrical generator is operatively coupled to and driven by the resonator to generate electrical power from the resonating movement.

24 Claims, 3 Drawing Sheets

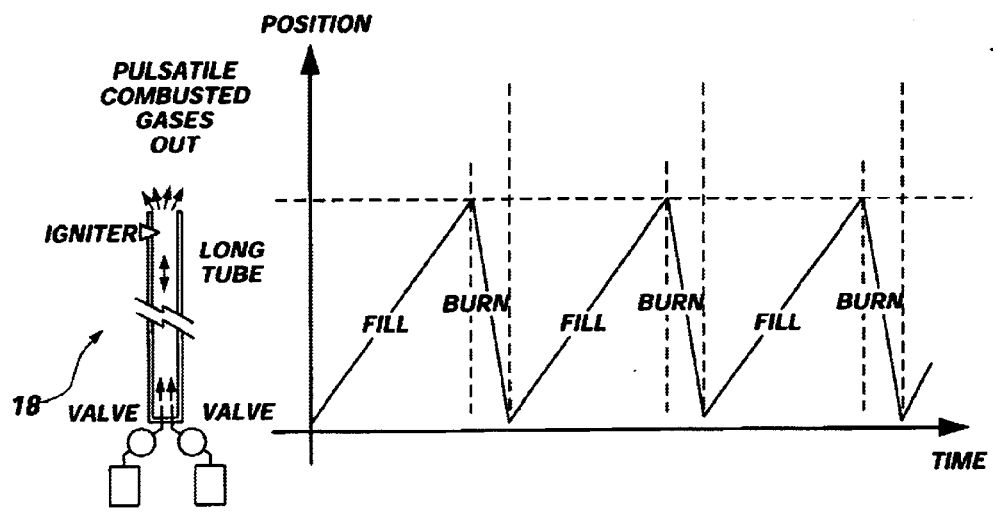
FIG. 3
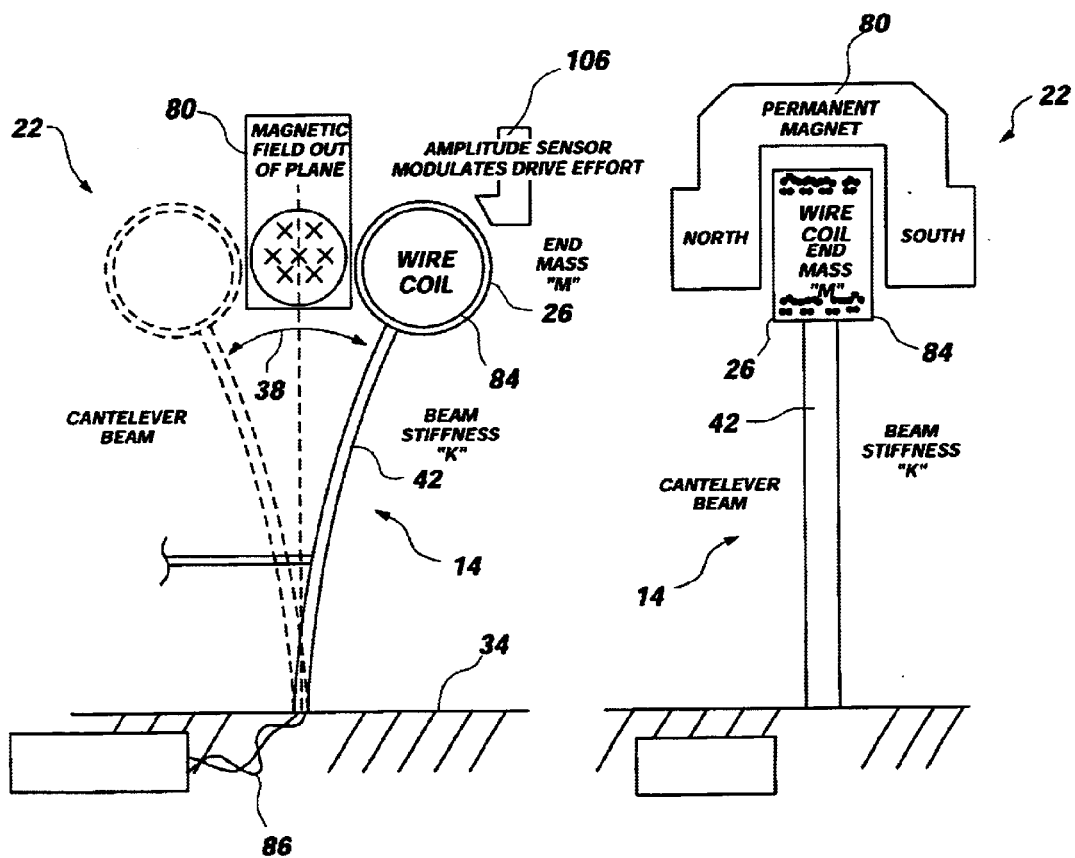
FIG. 4
FIG. 5

RESONANT ELECTRICAL GENERATION SYSTEM

This application is a continuation-in-part of U.S. patent application Ser. No. 09/439,473, filed Nov. 12, 1999 now U.S Pat. No. 6,375,454 issued Apr. 23, 2002; and Ser. No. 09/627,852, filed Jul. 28, 2000 now U.S. Pat No. 6,425,740 issued Jul. 30, 2002.

BACKGROUND OF THE INVENTION

1. The Field of the Invention

The present invention relates generally to a resonant electrical generation system, including a resonating system or structure to generate electricity, and a pulsatile combustion device to drive the resonating structure.

2. The Background Art

A revolutionary change in machine architecture is occurring wherein classical machines that produce energetic work, but do not compute, and classical systems that only compute, are merging to form systems that perform computed work in a progressively more automated fashion. Vehicles, military systems, robots, interfaces to synthetic environments, consumer products, and other information driven machines that move, are examples of systems where increasing numbers of actuators and sensors are being operated in closed-loop, using digital controllers so as to increase performance and flexibility. Maintaining the rate at which these new types of machines advance requires the balanced development of actuators, sensors, and computers, as well as the materials, structures, and processes used for their manufacture.

One difficult problem, which has received little attention, is that of actuation, specifically, using compact integrated high power density actuators having large displacement and force capabilities. The difficulties lie in the fact that the design of an integrated actuation system is a complex problem that requires the simultaneous satisfaction of multiple conflicting constraints. In fact, once actuators are considered as subsystems, it becomes clear that improvements or radically new approaches are required to three basic elements that form an integrated actuation subsystem, namely: 1) energy supplies; 2) energy modulation systems; and 3) output devices.

For example, in the case of smart material actuators, such as piezo-electric or magnetostrictive actuators, the requirements for efficient, compact energy supplies, power modulation electronics and motion amplification mechanisms makes the achievable system level power density (force-displacement-bandwidth density) significantly smaller than one would believe by simply looking at the intrinsic power density of the smart material alone.

SUMMARY OF THE INVENTION

It has been recognized that it would be advantageous to develop an energy supply, or electrical generation system. In addition, it has been recognized that it would be advantageous to develop an electrical generation system which is efficient and compact.

The invention provides a resonant electrical generation system which includes a resonator, an energy source, and an electrical generator. The resonator provides resonating movement in a resonating element. The energy source is operatively coupled to the resonating system to maintain the resonating movement of the resonating element. The electrical generator is operatively coupled to and driven by the resonating system, to generate electrical power from the resonating movement.

In accordance with one aspect of the present invention, the resonator can include a resonating structure, such as a mass and spring. The spring element can have one end coupled to a base, and another end coupled to the mass.

In accordance with another aspect of the present invention, the energy source can include a pulsatile combustion device. The energy source or pulsatile combustion device can include an elongated combustion tube with a mixing chamber and an exhaust port. A fuel source can be coupled to the mixing chamber of the combustion tube to provide fuel to the combustion tube. An igniter can be disposed in the combustion tube to ignite the fuel.

In accordance with another aspect of the present invention, the combustion tube can be coupled to the resonator by a piston/cylinder arrangement. A cylinder can be coupled to the exhaust port of the combustion tube, while a piston can be reciprocally disposed in the cylinder and driven by the exhaust gases. A push rod can be coupled to and between the piston and the resonator, to transmit movement of the piston to the resonator.

In accordance with another aspect of the present invention, the combustion tube can be configured to produce pulsatile combustion gasses out of the exhaust port corresponding the to a resonant frequency of the resonator.

In accordance with another aspect of the present invention, the electrical generator can include a magnet and a coil. One of the magnet or coil is attached to the resonator, and configured for resonating movement along a movement path, while the other one of magnet or coil is disposed adjacent the movement path. Thus, the magnet and coil can be movably disposed with respect to one another so that a magnetic field of the magnet is capable of inducing a current in the coil.

Additional features and advantages of the invention will be set forth in the detailed description which follows, taken in conjunction with the accompanying drawing, which together illustrate by way of example, the features of the invention.

BRIEF DESCRIPTION OF THE DRAWINGS

FIG. 3, is a schematic view of the operation of the energy source of FIG. 2;

FIG. 4 is a side view of a resonator of the resonant electrical generation system in accordance with the present invention;

FIG. 5 is an end view of the resonator of FIG. 4;

DETAILED DESCRIPTION

Figure 1:
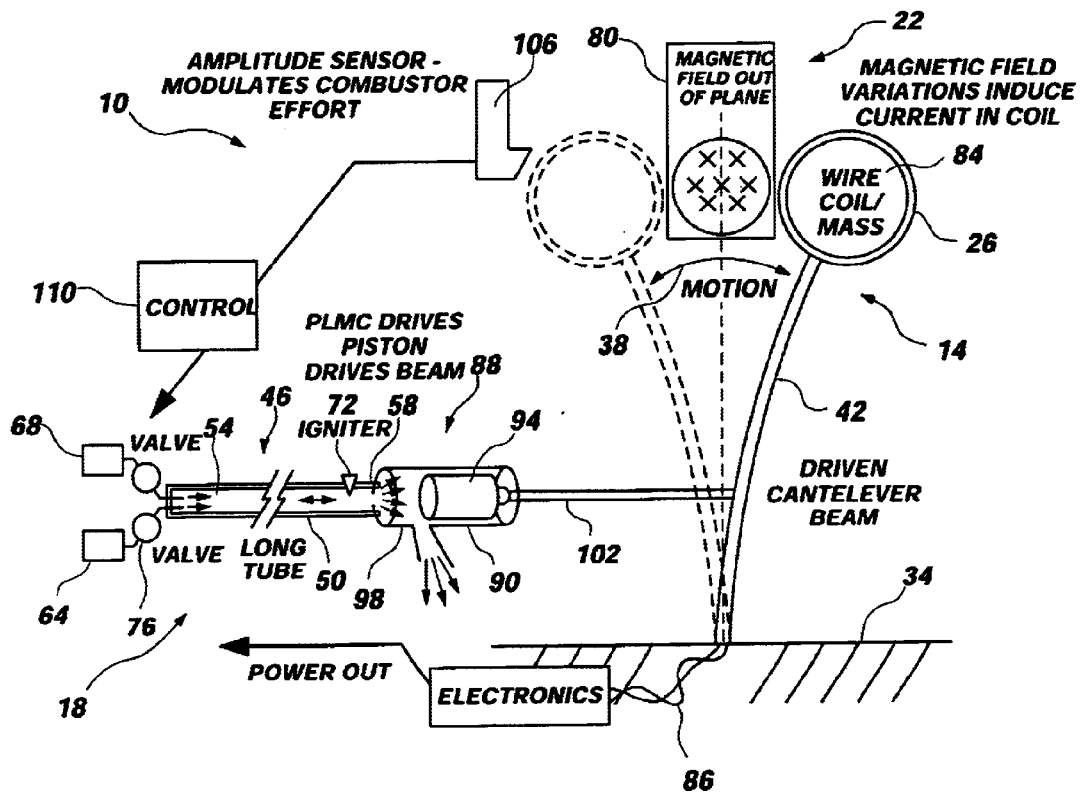
FIG. 1 is a schematic view of a resonant electrical generation system in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

As illustrated in FIG. 1, a resonant electrical generation system, indicated generally at 10, in accordance with the present invention is shown for generating electricity. Electrical generation is one example of a field which may benefit from use of such a system 10. Such a system 10, or the electricity produced therefrom, can be used with compact, integrated, high power density actuators described above. The resonant electrical generation system 10 includes a resonator 14, an energy source 18, and an electrical generator 22.

The resonator 14 provides resonating movement in a resonating element. Some aspects of resonating structures are disclosed in U.S. patent application Ser. No. 09/627,852, filed Jul. 28, 2000, now U.S. Pat. No. 6,425,740, issued Jul. 30, 2002, which is herein incorporated by reference. The resonator 14, or resonating structure, can include a mass and spring element which alternate between kinetic and potential energy states, or between maximum and minimum kinetic and potential energies. Such resonating structures may resonate or oscillate for extended periods of time, or continuously with minimal losses, such as friction. Also, the resonator loses energy to the generator.

The resonator 14, or resonating structure, includes a moving body, member, element or mass 26 having a mass m. The resonator 14 or mass 26 resonates or oscillates back and forth, as indicated by arrow 38, along a movement path. The resonator 14 or resonating structure also includes an energy storing and releasing system, such as a spring element 42 or cantelever beam. The spring element 42 flexes or bends to store and release energy. Thus, the mass 26 and spring element 42 form the resonator 14, or resonating structure, which resonates or oscillates 38. As the resonator 14 or mass 26 oscillates back and forth, it moves from a position of greatest potential energy (and least kinetic energy) at the far left range of motion, through a position of greatest kinetic energy (and least potential energy) as it moves through its middle range of motion, to a position of greatest potential energy (and least kinetic energy) at the far right range of motion.

The resonator 14 or resonating structure can resonate or oscillate for extended periods of time, or continually with minimal losses. Such resonating structures typically experience losses, such as friction, which eventually cause the resonating structure to stop resonating. Thus, an energy source, indicated generally at 18, is operative coupled to the resonator for maintaining the resonance, or oscillatory motion. The energy source 18 exerts a force on the resonator 14 or mass 26 to maintain resonance.

Figure 2:
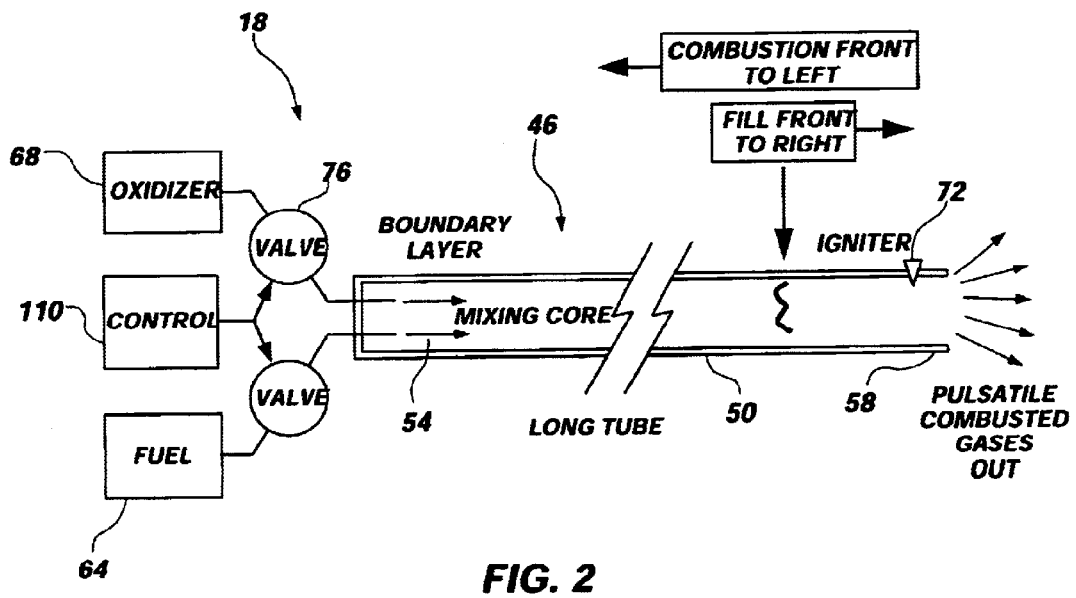
FIG. 2 is a schematic view of an energy source of the resonant electrical generation system in accordance with the present invention.

Referring to FIG. 2, the energy source 18 can include a pulsatile linear combustor 46 to provide hot gas for actuation, or a driving force for the resonator 14. The energy source 18 or pulsatile linear combustor 46 can include an elongated combustion tube 50 with a mixing chamber 54 and an exhaust port 58. A fuel source can be coupled to the tube 50 or mixing chamber 54, and can include both a fuel source 64 and an oxidizer source 68. The fuel source, or fuel and oxidizer, provides fuel to the combustion tube 50. An igniter 72 is disposed in the combustion tube 50 to ignite the fuel.

Some aspects of a pulsatile linear combustor are disclosed in U.S. patent application Ser. No. 09/439,473, filed Nov. 12, 1999, now U.S. Pat. No. 6,375,454, issued Apr. 23, 2002, which is herein incorporated by reference. The fuel source 64, and/or oxidizer source 68, can include reservoirs or tanks for holding the fuel and oxidizer, and fuel lines coupled to and between the tanks and the combustion tube 50 for transporting the fuel to the combustion tube. Valves 76 can be disposed between the fuel source and the combustion tube 50, or coupled to the fuel lines, to control the flow of fuel or oxidizer. In operation, the pulsatile linear combustor 46 transports fuel from the fuel source via the fuel lines to the combustion tube 50. The fuels and/or oxidizer are selected so that they are not combustible until they become a mixed fuel in tube 50 or mixing chamber 54.

Referring to FIG. 3, the tube 50 will gradually fill with the mixed fuel, filling from an inlet end near the mixing chamber 54 to the exhaust port 58. The mixed fuel will not be ignited until the tube 50 is substantially full and the mixed fuel reaches the igniter 72. Upon ignition by the igniter 72 the mixed fuel may not instantaneously and completely combust. The parameters of the combustor 46 can be selected so that the mixed fuel will first combust near an ignition point, at igniter 72, and sequentially combust the mixed fuel back through tube 50 until combustion has reached an extinguish end. Upon reaching the extinguish end, and since the unmixed fuels are selected for not combusting until after they are mixed, once the combustion process has combusted all of the mixed fuel located in tube 50, the combustion process will be self extinguished at the extinguishing end. Meanwhile, as the mixed fuel is being combusted, the expanding exhaust from the combustion process will be propelled out of tube 50 to actuate an actuatable object, as described below, or to maintain the resonance of the resonator 14.

Figure 6:
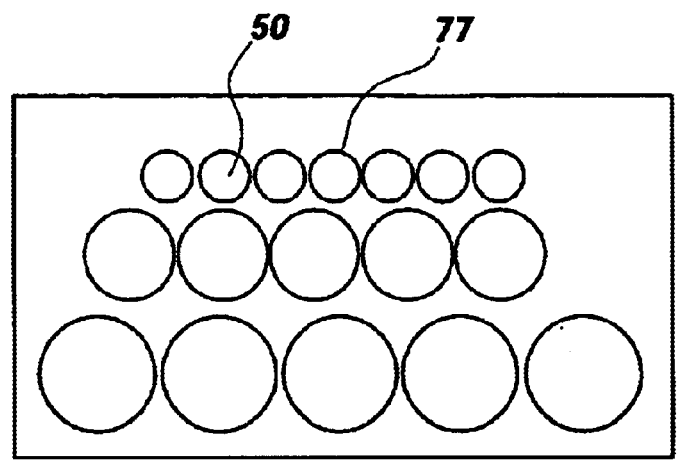
FIG. 6 is an end view of an array of combustion tubes with different diameters in accordance with the present invention.
Figure 7:
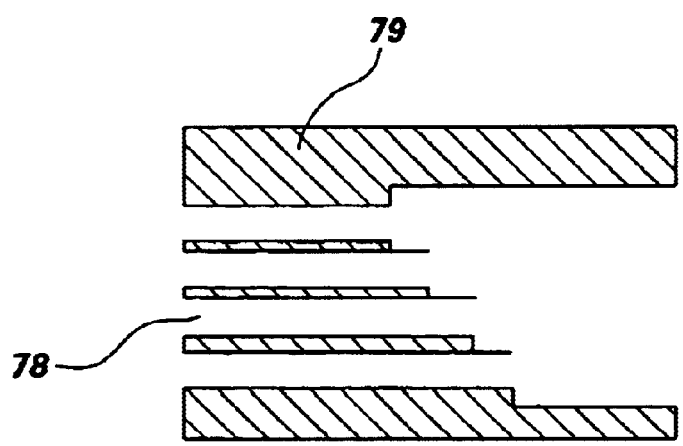
FIG. 7 is a cross-sectional side view of an array of combustion tubes with different lengths in accordance with the present invention.

In addition, referring to FIG. 6, an array 77 of combustion tubes 50 can be used, which may have the same or a variety of diameters, to allow for the generation of what can be referred to as a firing profile. A firing profile can be generated by controlling the firing of individual tubes 50 in the array 77, the flow rate of fuel, and varying the sequential timing of the firing. For example, one firing profile could be to fire, or ignite, only the tubes that are located around the periphery of the array. Another profile, could be, first firing the periphery tubes and then sequentially firing the next inner periphery layer of tubes towards the center of the array, and continue firing progressive layers until reaching the center tubes. Many combinations can be imagined, such as only firing the top half all at once, or only firing the largest diameter tubes. In addition, referring to FIG. 7, variable length tubes 78 can be used for an array 79. Thus, different firing profiles may be achieved by using not only different diameter tubes, but also by using different lengths of tubes or a combination of both variables. Therefore, different pressure or acoustic wave sequences can be achieved by controlling the firing profiles for various designs of arrays having varieties of lengths and diameters. The firing profile can be selected to maintain the desired resonance of the resonating structure, or the resonator.

Referring to FIGS. 4 and 5, the electrical generator 22 can be operatively coupled to, and driven by, the resonator 14 to generate electrical power from the resonating movement. The electrical generator 22 can include a magnet 80 and a coil 84 movably disposed with respect to one another, so that a magnetic field of the magnet 80 is capable of inducing a current in the coil 84, which can be used as desired, such as in a micro-machine system. The coil 84 can be attached to the resonator 14 and configured for resonating movement along a movement path with the mass 26. The coil 84 can be attached to the spring element or cantelever beam 42, and can form, or help form, the mass 26. The magnet 80 can be disposed adjacent the movement path of the coil 84 at a distance desired for electromagnetic interaction. It is of course understood that the location of the magnet 80 and coil 84 can be switched, with the magnet being disposed on the resonator, and the coil being disposed adjacent the movement path of the magnet. Wires 86 can be attached to and between the coil 84 and an output device to electrically connect the system 10 to the desired output device. The output device can include various electronics to further modify the electrical output of the system 10.

Referring again to FIG. 1, the energy source 18 or pulisitile linear combustor 46 can be operatively coupled to the resonator 14. A piston/cylinder device 88 can be coupled to the combustion tube 50 to receive the exhaust gases therefrom. The piston/cylinder device 88 can include a cylinder 90 coupled to the combustion tube 50, and a piston 94 movably or reciprocally disposed in the cylinder 90. As described above, as the mixed fuel is being combusted, the expanding exhaust from the combustion process will be propelled out of tube 50 and into the cylinder 90, thereby increasing the pressure located therein. The pressurization of the cylinder 90 can be used to drive the piston 94. The exhaust or combustion gases from the combustion tube 50 are received in the cylinder 90 and exert a force on the piston 94, displacing the piston 94 within the cylinder 90. An exhaust port 98 can be formed in the cylinder 90 to exhaust the exhaust or combustion gases from the cylinder 90. The port 98 can be located such that the piston 94 blocks or covers the port 98 in one position, but exposes the port 98 in a different, second position. Thus, the gases can drive the piston 94 to the second position, and then escape from the cylinder 90, allowing the piston 94 to return to the first position.

A push rod 102 can be coupled between the energy source 18 and resonator 14. The push rod 102 can be coupled to the piston 94 of the piston/cylinder device 88, and to the spring element 42 or cantelever beam of the resonator 14, to transmit movement of the piston 94 to the resonator 14.

In addition, a sensor 106 can be positioned to sense the resonation or oscillatory motion of the resonator 14 or mass 26, and to produce a sensor signal. A controller 110 can be coupled to the energy source 18, and can be responsive to the sensor signal, to control the energy source 18, and thus maintaining or controlling the amplitude and frequency of the resonation. The controller 110 can control the valves 76 to control the operation of the pulsitile linear combustor 46, as shown in FIG. 2. In addition, the control 110 can be used to achieve certain firing profiles, such as to sequence the igniters 72, and regulate the flow of fuel into respective tubes by sequencing the valves 76 to open and close appropriately. The controller 110 can include a computer with an appropriate program operable thereon, or another type of electrical or mechanical hardware. The controller 110 can provide a feedback loop between the various components.

The energy source 18 or pulsatile linear combustor 46 can be used to produce pulsatile combustion gases out of the exhaust port 54 of the combustion tube 50. The combustor 46 can be configured to produce gasses at a rate corresponding to the resonant frequency of the resonator 14. Preferably, the energy source 14 or combustor 46 produces gasses, and the resonator 14 resonates, at a frequency between approximately 50 Hz to 2 Khz.

In addition, the electrical generator 10 of the present invention can be utilized in micro-machines, or with micro-actuators. Thus, the generator 10 can be relatively small. For example, the combustion tube preferably has a diameter less than approximately 1100 microns.

As stated above, the electrical generation system 10 described above can be utilized with compact integrated actuation systems. In addition, such energy systems 10 or compact integrated actuation systems can incorporate design ideas derived from biological systems, and have an organismic architecture, i.e. highly interconnected sensors, actuators and controllers.

Biological systems achieve exquisite characteristics by building on architectures that use numerous elements arranged in parallel and/or series combinations to achieve the desired functional capabilities through intrinsic properties, as well as feedback control. These systems use many small elements configured to maximize efficiency and achieve redundancy. Desired proportional output is controlled by adding or recruiting elements in parallel and/or series, and by modulating the frequency at which the various elements act. Power is thereby modulated at the source rather than through dissipative processes, as in conventional systems. The bandwidth of the small elements are combined to yield the strength of a large element while maintaining the dexterity required for delicate tasks. Biological systems also capitalize on large surface area to volume ratios to achieve large transport processes flux and bandwidth, while maintaining small gradients.

Therefore, such compact integrated actuation systems can be comprised of modular energy systems 10, and output devices, that: 1) can be combined to produce controlled proportional output action (e.g. large pressure pulses or large production of heat), at high bandwidth; 2) allow modulation of the energy released directly at the source, thereby significantly reducing the losses associated with continuous operation of the first stage of energy conversion; and 3) exploit the high energy density associated with liquid or gas fuels to achieve high volumetric and weight efficiency.

It will be understood that the resonating structure can be of any shape, and can have any movement path, such as linear, circular, rotational, etc. In addition, a system such as described above may have off-resonance operation. Such off-resonance operation can be less efficient, but can have other advantages, such as constant displacement. Thus, such a structure as described above could operate under less than ideal, non-resonating conditions.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A resonant electrical generation system, comprising:

a) a resonator configured to provide resonating movement in a resonating element;

b) an energy source, operatively coupled to the resonator, to support resonating movement of the resonating element, including:
   an elongated combustion tube having a mixing chamber and an exhaust port;
   a fuel source, coupled to the mixing chamber of the combustion tube, configured to provide fuel to the combustion tube; and
   an igniter, in the combustion tube, configured to ignite the fuel;
c) an electrical generator, operatively coupled to and driven by the resonator, configured to generate electrical power from the resonating movement;
d) a cylinder, coupled to the exhaust port of the combustion tube;
e) a piston, reciprocally disposed in the cylinder; and
f) a push rod, coupled to and between the piston and the resonator, configured to transmit movement of the piston to the resonator.

2. A system in accordance with claim 1, wherein the resonator includes:
   a) a base;
   b) a spring element, coupled at one end to the base; and
   c) a mass, coupled to another end of the spring element, configured for resonating movement with respect to the base.

3. A system in accordance with claim 1, wherein the combustion tube is configured to produce pulsatile combustion gasses out of the exhaust port corresponding to a resonant frequency of the resonator.

4. A system in accordance with claim 1, wherein the combustion tube has a diameter less than approximately 1100 microns.

5. A system in accordance with claim 1, wherein the electrical generator includes:
   a magnet and a coil, one of which is attached to the resonator and configured for resonating movement along a movement path, and the other one of which is disposed in a fixed position adjacent the movement path, the magnet and coil being movably disposed with respect to one another so that a magnetic field of the magnet is capable of inducing a current in the coil.

6. A system in accordance with claim 1, wherein the resonator includes:
   a) a base;
   b) a spring element, coupled at one end to the base; and
   c) a mass, coupled to another end of the spring element, configured for resonating movement with respect to the base.

7. A system in accordance with claim 1, wherein the resonator resonates at a frequency between approximately 50 Hz to 2 KHz.

8. A resonant electrical generation system, comprising:
   a) a resonating system configured to provide resonating movement in a resonating element;
   b) a combustion tube, operatively coupled to the resonating system, configured to produce pulsatile combustion gases to support resonating movement of the resonating system; and
   c) a magnet and a coil, one of which is attached to the resonating system and configured for resonant movement along a movement path, and the other one of which is disposed in a fixed position adjacent the movement path, the magnet and coil being movably disposed with respect to one another so that a magnetic field of the magnet is capable of inducing a current in the coil.

9. An apparatus in accordance with claim 8, wherein the resonating system includes:
   a) a base;
   b) a spring element, coupled at one end to the base; and
   c) a mass, coupled to another end of the spring element, configured for resonating movement with respect to the base.

10. An apparatus in accordance with claim 8, further comprising:
    a) a cylinder, coupled to the exhaust port of the combustion tube;
    b) a piston, reciprocally disposed in the cylinder; and
    c) a push rod, coupled to and between the piston and the resonating system, configured to transmit movement of the piston to the resonating system.

11. An apparatus in accordance with claim 8, wherein the combustion tube is configured to produce pulsatile combustion gasses out of the exhaust port corresponding to a resonant frequency of the resonating system.

12. An apparatus in accordance with claim 8, wherein the resonator resonates at a frequency between approximately 50 Hz to 2 KHz.

13. An apparatus in accordance with claim 8, wherein the combustion tube has a diameter less than approximately 1100 microns.

14. An electrical generation system, comprising:
    a) a resonating structure configured for resonating movement, including:
       1) a base;
       2) a spring element, coupled at one end to the base; and
       3) a mass, coupled to another end of the spring element, configured for resonating movement with respect to the base;
    b) an energy source, operatively coupled to the resonating structure, to support resonating movement, including:
       1) an elongated combustion tube having a closed end, a mixing chamber and an exhaust port at an opposite end, the resonating structure being operatively coupled to the exhaust port of the combustion tube;
       2) a fuel source, coupled to the mixing chamber of the combustion tube, configured to provide fuel to the combustion tube; and
       3) an igniter, disposed in the combustion tube, configured to ignite the fuel; and
    c) an electrical generator, operatively coupled to and driven by the resonating structure, configured to generate electricity due to the resonating movement.

15. A system in accordance with claim 14, wherein the electrical generator includes:
    a magnet and a coil, one of which is attached to the resonating structure and configured for resonant movement along a movement path, and the other one of which is disposed in a fixed position adjacent the movement path, the magnet and wire being movably disposed with respect to one another so that a magnetic field of the magnet is capable of inducing a current in the coil.

16. A system in accordance with claim 14, wherein the resonator resonates at a frequency between approximately 50 Hz to 2 KHz.

17. A system in accordance with claim 14, wherein the combustion tube has a diameter less than approximately 1100 microns.

18. A resonant electrical generation system, comprising:
    a) a resonator configured to provide resonating movement in a resonating element;

b) an energy source, operatively coupled to the resonator, to support resonating movement of the resonating element, including:
    an elongated combustion tube having a mixing chamber and an exhaust port and a diameter less than approximately 1100 microns;
    a fuel source, coupled to the mixing chamber of the combustion tube, configured to provide fuel to the combustion tube; and
    an igniter, in the combustion tube, configured to ignite the fuel; and
c) an electrical generator, operatively coupled to and driven by the resonator, configured to generate electrical power from the resonating movement.

19. A system in accordance with claim 18, wherein the resonator includes:
   a) a base;
   b) a spring element, coupled at one end to the base; and
   c) a mass, coupled to another end of the spring element, configured for resonating movement with respect to the base.

20. A system in accordance with claim 18, further comprising:
   a) a cylinder, coupled to the exhaust port of the combustion tube;
   b) a piston, reciprocally disposed in the cylinder; and
   c) a push rod, coupled to and between the piston and the resonator, configured to transmit movement of the piston to the resonator.

21. A system in accordance with claim 18, wherein the combustion tube is configured to produce pulsatile combustion gasses out of the exhaust port corresponding to a resonant frequency of the resonator.

22. A system in accordance with claim 18, wherein the electrical generator includes:
   a magnet and a coil, one of which is attached to the resonator and configured for resonating movement along a movement path, and the other one of which is disposed in a fixed position adjacent the movement path, the magnet and coil being movably disposed with respect to one another so that a magnetic field of the magnet is capable of inducing a current in the coil.

23. A system in accordance with claim 18, wherein the resonator includes:
   a) a base;
   b) a spring element, coupled at one end to the base; and
   c) a mass, coupled to another end of the spring element, configured for resonating movement with respect to the base.

24. A system in accordance with claim 18, wherein the resonator resonates at a frequency between approximately 50 Hz to 2 KHz.

* * * * *